Jan. 11, 1944. H. STRAUB 2,338,981
METHOD AND DEVICE FOR MEASURING THE THICKNESS
OF LIGHT TRANSMITTING LAYERS
Filed Aug. 26, 1940
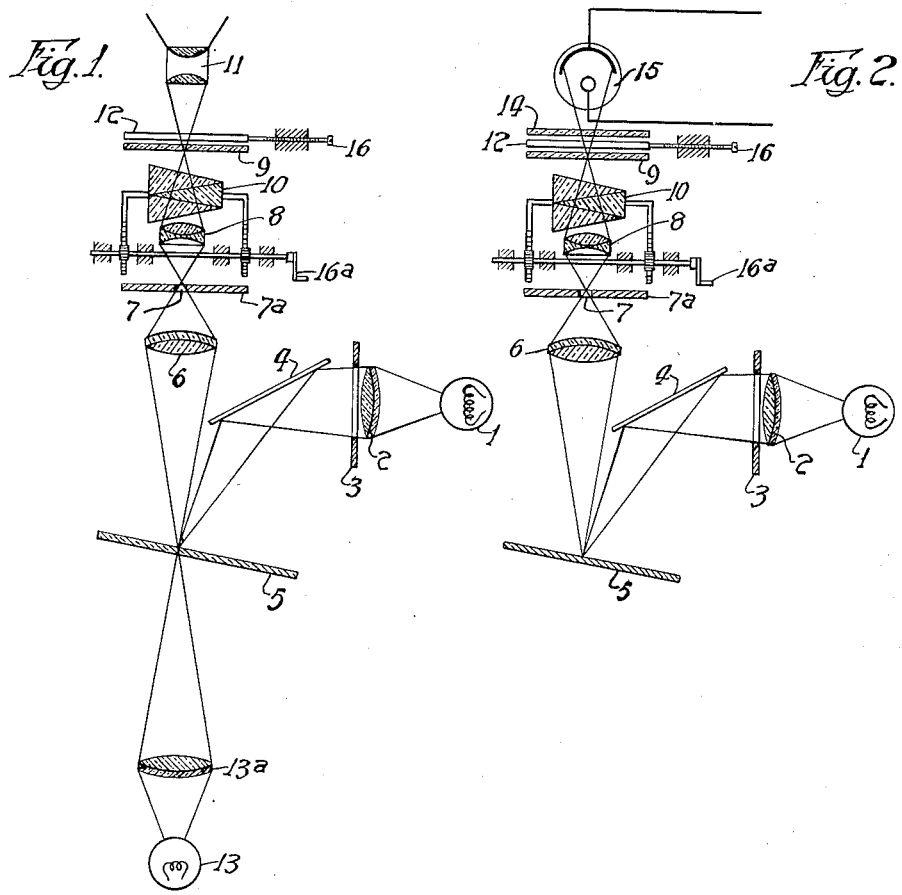
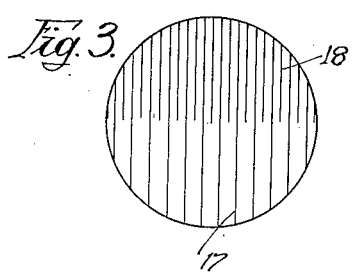
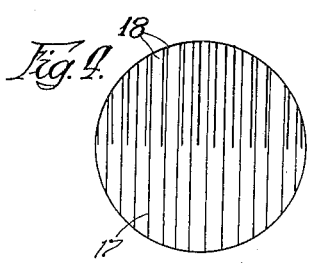
Inventor:
Harald Straub,
By:
Singer, Ehlert, Stern & Carlberg
Attorneys Patented Jan. 11, 1944

2,338,981

UNITED STATES PATENT OFFICE 2,338,981

METHOD AND DEVICE FOR MEASURING THE THICKNESS OF LIGHT TRANSMITTING LAYERS

Harald Straub, Dresden, Germany; vested in the Alien Property Custodian

Application August 26, 1940, Serial No. 354,220 In Germany June 6, 1939

4 Claims. (Cl. 88—14)

The invention relates to improvements in a method and device for optically measuring the thickness of light transmitting layers.

Heretofore it was customary to measure the thickness of light transmitting layers, for instance of layers which in photographic films serve as carrier for the light sensitive emulsion, by means of micrometer gauges or the like. This well known method, however, has a number of disadvantages. First of all, only certain selected portions or samples of the layers can be measured, whereby the points of the layer subjected to the measurement are apt to be deformed by the pressure of the measuring device. Furthermore, the layers can only be measured while at rest and when brought into a predetermined position with respect to the measuring device. When the layers or films are relatively large it is possible only to gauge the thickness near the edge of the layers, while the center portions of the same can only be measured by cutting samples out of these center portions and gauging these samples.

The principal object of the invention is to overcome the disadvantages of the above named mechanical measuring methods by substituting therefor an optical measuring method which employs the interference of light waves.

In accordance with the invention a beam of light furnishing a continuous spectrum is projected onto the light transmitting layer whose thickness is to be determined. This beam of light, upon being reflected from the front face and rear face of the layer, is spectroscopically analysed and the number of dark spots (interference bands) appearing within a predetermined range of wave lengths is counted and serves as a measure for the thickness of the layer. Theoretically, the following relation exists:

$$D = \frac{P}{2} \cdot \frac{\lambda 1 . \lambda 2}{\lambda 1 - \lambda 2} \cdot (n^2 - \sin^2 \phi)^{-\frac{1}{2}}$$

wherein:

D is the thickness of the layer being measured.
P is the number of dark spots appearing in the viewing area.
$\lambda 1$ and $\lambda 2$ are the upper and lower limits respectively of the wave length range in which the dark spots are counted.
n is the refractive index of the material of the layer being measured, and $\varphi$ is the angle of incidence of the light beam striking the layer.

The above equation shows that the value P, namely the number of the dark spots, is dependent upon the angle $\varphi$ at which the beam of light strikes the layer whose thickness is to be determined. The number of dark spots (interference bands) in the mentioned range of the spectrum is within practical limits independent of the angle of incidence when the illuminating beam of light strikes the layer as nearly as possible perpendicularly. It is also possible to select an angle of incidence which is so small that the light beam practically grazes only the layer, but this has the disadvantage against perpendicular incidence that practically the front face only of the layer to be measured will reflect the illuminating beam of light, and this results in a blurred image in the field of observation.

When putting the method of the invention into practice attention has to be paid to the proper selection of the aperture of the illuminating beam of light or of the reflected beam or of both, as it is known from light interference arrangements employed for other purposes. When selecting, however, a very small angle of incidence or perpendicular incidence one is independent within wide limits of the size of the aperture.

It is particularly advantageous for practical considerations to make the aperture of the reflected beam of light, which furnishes the measuring data, larger than that of the illuminating beam of light, or vice versa. In such case the observer may vary within wide limits the relative position of the layer to be measured with respect to the measuring device. The term "relative position of the layer to be measured with respect to the measuring device" refers not only to the distance of the layer from the measuring device, but also to its angular position with respect to the same.

For this purpose of adjusting the aperture the well known iris diaphragms, adjustable slits or any other means acting as diaphragm or stop may be employed.

As is apparent from the above equation the number of dark bands within a predetermined range of wave lengths has to be counted. The limits of this range of wave lengths may be fixed in different manners. It is, for instance possible, to determine the limits of the range of wave lengths, between which the count is to take place, by means of two known lines of the spectrum which are emitted from a separate source of light.

The limits of the range of the wave lengths within which the dark bands are counted may also be determined by the width of the continuous spectrum emitted from the illuminating light source.

Furthermore, the limits of the above named range of wave lengths may be determined by blocking filters, i. e. color filters, which permit the passage of a predetermined range only of the spectrum.

It appears particularly suitable to determine the limits of the range of the wave lengths by means of masking devices, which may be adjustable, and which are positioned at the very place where the spectrum appears, i. e. so called viewing masks.

The dark spots may advisably be counted by means of a transparent comparison plate or gauge, which is also positioned at the place of the spectrum. It is also feasible to produce by optical means a real or virtual image of the comparison plate in the viewing area of the ocular.

The comparison plate may consist of a transparent carrier provided with light absorbing bands which preferably have the same distribution as the interference bands in the spectrum to be examined. Preferably, a number of different comparison plates are produced, so that an operator may have at his disposal comparison plates for layers of different thicknesses, which different layers will produce in the spectrum different numbers of dark spots when subjected to the measurement depending upon the respective thickness. If any one of the comparison plates has the same number of absorption bands as there are dark lines in the spectrum, the thickness of the layer under examination can be ascertained from the comparison plate without further computation. Each comparison plate may have inscribed thereon the thickness of the layer which it represents. If the absorption bands of the comparison plate do not register in their entirety with the dark lines of the spectrum, a condition exists which in physics is known as "beats" i. e. the light absorption bands of the comparison plate and the dark lines of the spectrum appear in certain space intervals in coincidence and out of coincidence. The numbers of registrations and/or failures to register respectively, are an index for the deviation of the thickness of the layer under examination from the thickness represented by the particular comparison plate which is being used.

The reflected beam of light is advisably analysed spectroscopically by a so called direct-vision or Amici prism. Preferably a prism is selected which is within the range of the maximum spectroscopic sensitiveness of the human eye, i. e. around 5500 Å., it is also possible to use another prism, but a direct-vision prism has the advantage that when it is adjusted in axial direction it may be used for varying the measuring range. In such case it is possible to work always with one and the same comparison plate. The latter preferably is mounted adjustably on the device.

The comparison plate or standard plate may, for instance, consist of a photograph of a system of dark spots (interference bands) or a carrier made of glass and provided with screen lines. It is also possible, however, to introduce by means of reflection a standard interference band system into the measuring field in such manner that both interference band systems are separate from each other, but preferably appear adjacent each other or partly in superposed position. The standard band system may have been produced in the same manner as the band system to be measured.

The drawing illustrates diagrammatically and by way of example devices adapted to practice the measuring method of the present invention, wherein Fig. 1 is an optical arrangement according to the invention, Fig. 2 is a modification of the device according to the invention and Figures 3 and 4 are representations of the field of view, which can be observed, when looking into the view opening of the device.

A beam of light from the source 1 and passing through the concentrating lens system 2 and the diaphragm 3 is directed by means of the mirror 4 onto the light transmitting layer 5 whose thickness is to be determined. The waves of the concentrated light beam striking the layer 5 are reflected from the latter, namely, from the top and lower face of the same in a manner well known, and are concentrated by means of the lens system 6 to pass through a slot 7 in the plate 7$^a$. The objective 8 produces in the plane 9 a spectrum owing to the interposition of the direct-vision prism 10, which spectrum is viewed through the ocular 11. This spectrum contains the dark spots or bands produced by the layer 5 in the reflected light beam. When viewing a spectrum containing a great number of interference bands it is advisable to employ an ocular containing a cylindrical lens or lenses arranged in such manner that an enlargement is produced perpendicularly only to the length of the interference bands. In the first illustrated embodiment a comparison or standard plate 12 is employed which is mounted directly above the plane 9.

The limits of the range of wave lengths mentioned above may be determined by two known spectral-lines, which are emitted from the separate source of light 13. By means of a lens 13$^a$, an optical system 6, an objective 8 and a direct-vision prism 10, these lines appear in the viewing field of the device.

In Fig. 2 the separate light source 13 is omitted and for limiting the range of wave lengths there is arranged a blocking filter 14. The blocking filter 14 may also be replaced by a diaphragm in the field of view (not represented). The blocking filter may be arranged elsewhere in the illuminating or observing ray path, but the diaphragm in the field of view must be arranged in the same plane, as the spectrum at 9 appears to the observer. In Fig. 2 the eye-piece 11 is replaced by a photoelectric cell 15.

The comparison or standard plate 12 and the direct-vision prism 10 are represented in the Figures 1 and 2 as being movable by the devices 16 and 16$^a$ respectively. The comparison plate 12 is movable across the path of light rays, while the direct-vision prism is displaceable in the direction of the path of the light rays toward and away from the comparison plate.

In Figures 3 and 4 the numeral 17 designates the dark bands produced by the layer to be measured and 18 represents the dark bands of the comparison plate. In Fig. 4 there is represented in the field of view a so-called "beat."

I claim:

1. In a method of optically measuring the thickness of a light transmitting layer wherein a beam of light from a source emitting a continuous spectrum is projected substantially perpendicularly onto the layer and the light reflected from the top and bottom faces of the layer is dispersed to form a spectrum in which the number of dark interference bands which appear within a selected range of wave lengths in the light from said source is to be determined, the step of distinguishing the limits of said range within which the number of interference bands is to be determined comprising directing light from a second source along the path of the light reflected from said layer and dispersing the light from the second source with the light reflected from the layer, said second source of light providing a discontinuous line spectrum the lines of which substantially correspond to the selected limits of said wave length range.

2. The combination in a device for measuring optically the thickness of a light transmitting layer of a source of light which has a continuous spectrum, means for projecting light from said source substantially perpendicularly onto the light transmitting layer whose thickness is to be determined, lens means intercepting the light reflected from the layer being measured and bringing said reflected light to a focus, a direct vision prism located in the path of said reflected light between said lens means and the plane of said focus whereby a spectrum appears in said focal plane, and means for comparing the dark interference bands appearing in the spectrum with an interference band system produced by reflecting light of a character similar to that emitted by said source from a layer of material of a character similar to that of the layer being measured but of standard thickness whereby to determine the thickness of the layer being measured by the degree of registration between the two sets of interference bands, said means comprising a light transmitting comparison plate provided with light absorbing stripes arranged in a band system similar to that produced by said standard layer when light similar to that of the light emitted by said source is reflected from said standard layer, said comparison plate being positioned substantially in said focal plane.

3. The combination in a device for measuring optically the thickness of a light transmitting layer as claimed in claim 2 wherein lens means are employed to view the comparison plate and the interference bands produced in the light reflected from the layer undergoing measurement.

4. The combination in a device for measuring optically the thickness of a light transmitting layer as claimed in claim 2, wherein photoelectric cell means are positioned in the path of the light reflected from the layer being measured after said light has passed through said prism and said comparison plate whereby to determine the degree of registration between the interference bands in the spectrum produced by the prism and the interference band system on said comparison plate.

HARALD STRAUB.